United States Patent
Brogren

(10) Patent No.: US 8,347,601 B2
(45) Date of Patent: Jan. 8, 2013

(54) DEVICE FOR PIVOTING AT LEAST ONE PIVOTABLE ELEMENT IN A GAS TURBINE ENGINE

(75) Inventor: Rustan Brogren, Vänersborg (SE)

(73) Assignee: Volvo Aero Corporation, Trollhättan (SE)

( * ) Notice: Subject to any disclaimer, the term of this patent is extended or adjusted under 35 U.S.C. 154(b) by 519 days.

(21) Appl. No.: 12/298,141

(22) PCT Filed: May 4, 2006

(86) PCT No.: PCT/SE2006/000544
§ 371 (c)(1),
(2), (4) Date: Oct. 23, 2008

(87) PCT Pub. No.: WO2007/129937
PCT Pub. Date: Nov. 15, 2007

(65) Prior Publication Data
US 2009/0229244 A1    Sep. 17, 2009

(51) Int. Cl.
F02K 3/02 (2006.01)
F02K 1/00 (2006.01)
B05B 12/00 (2006.01)
F01B 25/00 (2006.01)

(52) U.S. Cl. .......... 60/226.3; 60/226.2; 60/230; 60/785; 239/265.25; 239/265.29; 415/145; 415/160; 415/162; 415/163

(58) Field of Classification Search .............. 60/782, 60/785, 226.3, 226.2, 230; 239/265.25, 265.29; 244/110 B; 415/145, 150, 159–164
See application file for complete search history.

(56) References Cited

U.S. PATENT DOCUMENTS

| | | | | |
|---|---|---|---|---|
| 3,253,840 A | * | 5/1966 | Granning | 280/425.1 |
| 3,391,869 A | * | 7/1968 | Glass | 239/265.19 |
| 3,638,428 A | * | 2/1972 | Shipley et al. | 60/226.1 |
| 3,799,474 A | * | 3/1974 | Scharzler | 244/216 |
| 3,809,429 A | * | 5/1974 | Channell | 298/17 S |
| 4,441,313 A | * | 4/1984 | Joubert et al. | 60/262 |
| 4,856,962 A | * | 8/1989 | McDow | 415/115 |
| 5,082,182 A | * | 1/1992 | Bruchez et al. | 239/265.35 |
| 5,328,098 A | * | 7/1994 | Barcza et al. | 239/265.35 |
| 5,680,755 A | * | 10/1997 | Hauer et al. | 60/266 |

(Continued)

FOREIGN PATENT DOCUMENTS
EP 0511770 A1 4/1992
GB 2259328 A 3/1993

OTHER PUBLICATIONS
International Search Report for corresponding International Application PCT/SE2006/000544.

Primary Examiner — Ehud Gartenberg
Assistant Examiner — Michael B Mantyla
(74) Attorney, Agent, or Firm — WRB-IP LLP

(57) ABSTRACT

A device is provided for pivoting at least one pivotable element in a gas turbine engine between a first and a second position in order to influence a gas flow in an annular gas duct in at least one of the positions. The device includes a moveable annular member which is arranged externally around the gas duct and is connected to the pivotable element in order to effect the pivoting of the pivotable element. The annular member is more specifically arranged to be displaced in a substantially axial direction and arranged to pivot the pivotable element when it is displaced axially.

21 Claims, 7 Drawing Sheets

U.S. PATENT DOCUMENTS

| | | | | |
|---|---|---|---|---|
| 5,740,988 A | * | 4/1998 | Ausdenmoore | 244/52 |
| 5,779,152 A | * | 7/1998 | Renggli et al. | 239/265.33 |
| 6,102,307 A | * | 8/2000 | Elorriaga et al. | 239/265.39 |
| 6,142,416 A | * | 11/2000 | Markstein et al. | 244/53 R |
| 6,192,671 B1 | * | 2/2001 | Elorriaga | 60/230 |
| 6,742,324 B2 | | 6/2004 | Bachelder et al. | |

* cited by examiner

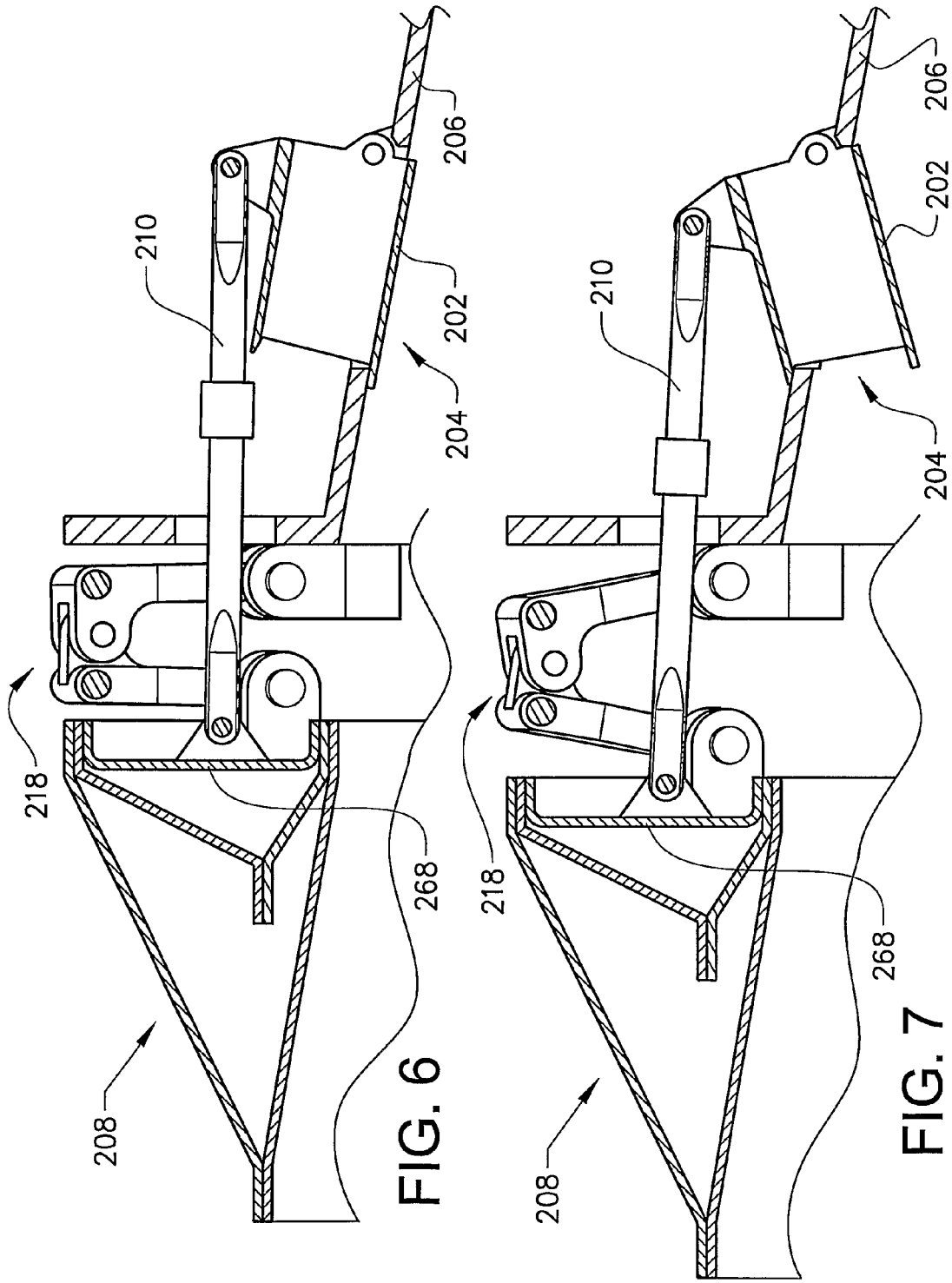

DEVICE FOR PIVOTING AT LEAST ONE PIVOTABLE ELEMENT IN A GAS TURBINE ENGINE

BACKGROUND AND SUMMARY

The present invention relates to a device for pivoting at least one pivotable element in a gas turbine engine between a first and a second position in order to influence a gas flow in an annular gas duct in at least one of said positions, the device comprising a moveable annular member, which is arranged externally around the gas duct and is connected to the pivotable element in order to effect the pivoting of the pivotable element. The invention also relates to a gas turbine engine comprising the device.

The device can be used in order to regulate the tapping (bleeding) of air. The device will be described below for opening and closing an opening in a wall, which defines a gas duct for bleeding air. Multiple bleed openings are conventionally spaced at intervals from one another in a circumferential direction around the gas duct and through the gas duct wall. A corresponding number of pivotable elements are correspondingly spaced at intervals from one another in a circumferential direction and form doors, or hatches, designed to control the degree of opening of the openings.

The device will be described for a jet engine in an aircraft. In known aircraft engines a bleed line extends between a primary gas duct and a secondary gas duct for bleeding off air from the primary gas duct to the secondary gas duct. In certain operating situations compressed air is bled off from the primary gas duct via the bleed line and is introduced into a high-velocity flow in the secondary gas duct.

The term jet engine is intended to encompass different types of engines which draw in air at relatively low velocity, heat this up by through combustion, and expel it at a much higher velocity. The term jet engine includes turbojet engines and turbofan engines, for example. The invention will be described below for a turbofan engine, but can obviously also be used for other types of engines.

U.S. Pat. No. 6,742,324 shows a valve system for the variable control of a gas bypass. The system comprises a unison ring, which is arranged radially outside a gas duct wall. The ring is connected to a bypass hatch, which covers an opening through the wall via a bell-crank lever. The ring is arranged to pivot in a circumferential direction and the hatch is opened and closed when the ring is pivoted in its circumferential direction.

It is desirable to provide a device for pivoting at least one pivotable element in a gas turbine engine, especially a bleed hatch, which represents an alternative to known solutions. It is also desirable to achieve a longer service life than such devices hitherto known.

According to an aspect of the present invention, the annular member is arranged to be displaced in a substantially axial direction and is arranged to pivot the pivotable element when it is displaced axially.

Such an axial, straight movement creates the prerequisites for a more reliable functioning in operation. Furthermore, fewer friction losses occur. In addition, the device is less sensitive to problems associated with the different rates of expansion of the constituent components, which can occur owing to thermal loads.

According to a preferred embodiment of the invention the pivotable element forms a hatch, which is arranged to open and close an opening in a wall, which defines the gas duct for the purpose of bleeding gas. In this case the pivotable element influences the gas flow when it is disposed in a open position, whereas the gas flow passes the pivotable element unaffected when the pivotable element is in a closed position. Multiple doors are preferably arranged at intervals from one another in a circumferential direction and each door is positioned in order to open and close one opening in the wall.

According to another preferred embodiment of the invention the pivotable element forms a guide vane which is arranged in the gas duct, the guide vane being arranged to be positioned in at least two different angular positions. Multiple guide vanes are preferably spaced at intervals from one another in a circumferential direction. The guide vanes are arranged in a fixed part of the gas turbine and the gas flow passes the guide vanes in the space between these. In this case the guide vanes influence the passing gas flow to a different extent depending on their angular setting.

According to a further preferred embodiment of the invention, the device comprises at least one motion-transmitting member, which mechanically connects the axially displaceable annular member and the pivotable element. An axial displacement of the annular member will thereby be transmitted to the pivotable element via an at least substantially axial displacement of the motion-transmitting member, which creates the prerequisites for reliable functioning in operation.

According to a further preferred embodiment of the invention, the device comprises a linkage mechanism, which supports the axially displaceable annular member in relation to a fixed part and is arranged to control the axial movement of the annular member.

According to a more detailed design of the last aforementioned embodiment, the linkage mechanism comprises at least two parallel stabilizer bars, a first stabilizer bar being pivotably connected to the annular member at two separate positions in a circumferential direction, and a second stabilizer bar being pivotably connected to the fixed part at two separate positions in a circumferential direction. The stabilizer bars mean that the movement can be controlled so that all pivotable elements are pivoted in the same way and equally far.

Further advantageous embodiments and further advantages of the invention are set forth in the detailed description below, in the drawings.

BRIEF DESCRIPTION OF THE DRAWINGS

The invention will be explained below with reference to the embodiments shown in the drawings attached, in which FIGS. 6 and 7 show a sectional side view of the linkage mechanism in two different positions, corresponding to a closed and an open position of a bleed hatch respectively.

DETAILED DESCRIPTION

Figure 1:
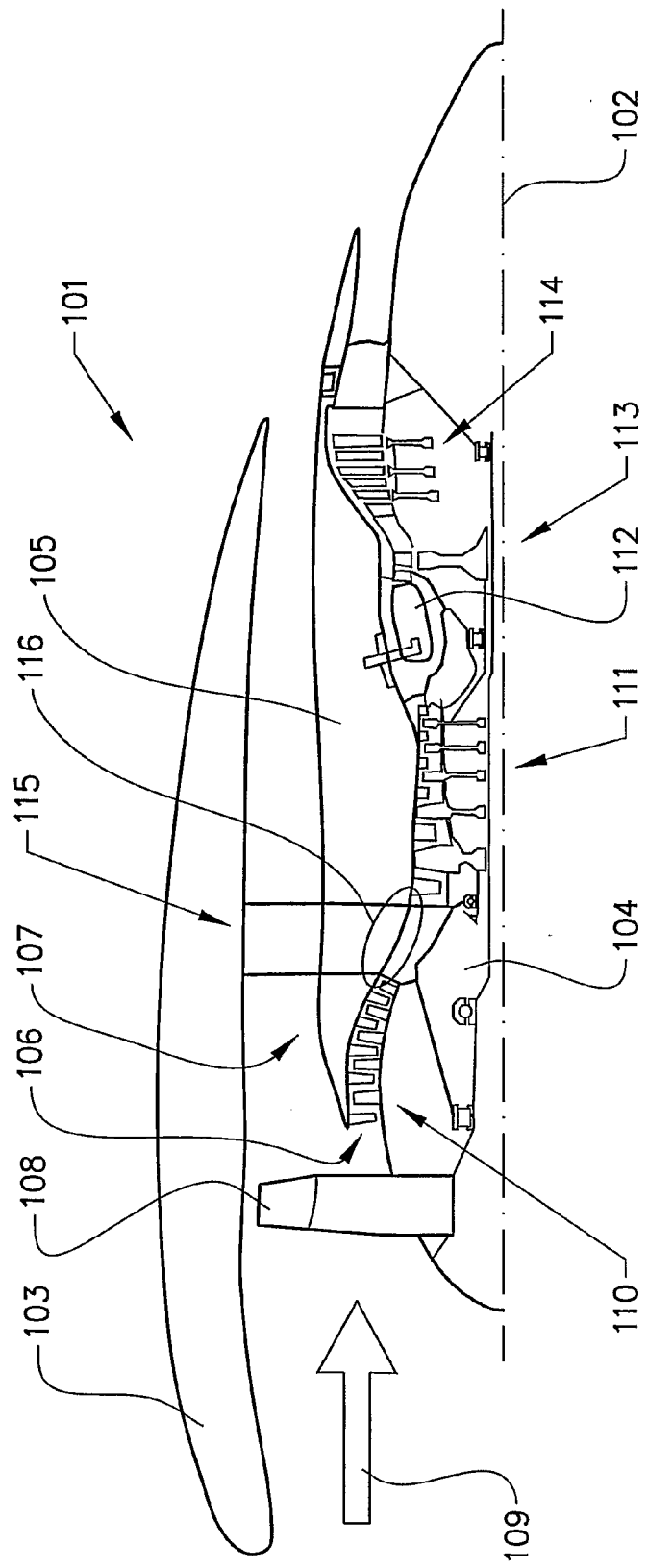
FIG. 1 is a schematic illustration in longitudinal cross section of a turbofan gas turbine engine for an aircraft.

The invention will be described below for a turbofan engine 101 for an aircraft, which in FIG. 1 circumscribes a longitudinal engine central axis 102.

The engine 101 comprises an outer cowling 103, an inner casing 104 and an intermediate casing 105, which is concentric with the first two casings and divides the gap between these into an inner primary gas duct 106 for the compression of air and a secondary duct 107, in which the engine bypasses air flows. Thus each of the gas ducts 106, 107 is annular in a cross section at right angles to the longitudinal central axis 102 of the engine.

The engine 101 comprises a fan 108, which admits ambient air 109, a booster or low-pressure compressor (LPC) 110 and a high-pressure compressor (HPC) 111 arranged in the primary gas duct 106, a combustion chamber 112 which mixes fuel with the air pressurized by the high-pressure compressor 111 in order to generate combustion gases, which flow downstream through a high-pressure turbine (HPT) 113 and a low-pressure turbine (LPT) 114, from whence the combustion gases flow out of the engine.

A high-pressure shaft connects the high-pressure turbine 113 to the high-pressure compressor 111 in order to form a high-pressure rotor. A low-pressure shaft connects the low-pressure turbine 114 to the low-pressure compressor 110 in order to form a low-pressure rotor. The high-pressure compressor 111, the combustion chamber 112 and the high-pressure turbine 113 are together referred to as a core engine. The low-pressure shaft is rotatably arranged at least partially coaxially with and radially inside the high-pressure rotor.

A load-bearing engine structure 115 is arranged between the outer cowling 103 and the inner casing 104. The load-bearing engine structure 115 is usually referred to as the "fan hub frame".

FIGS. 2-7 show a first application of the invention, that is to say a device for controlling the bleeding of gas in the gas turbine engine 101.

Figure 2:
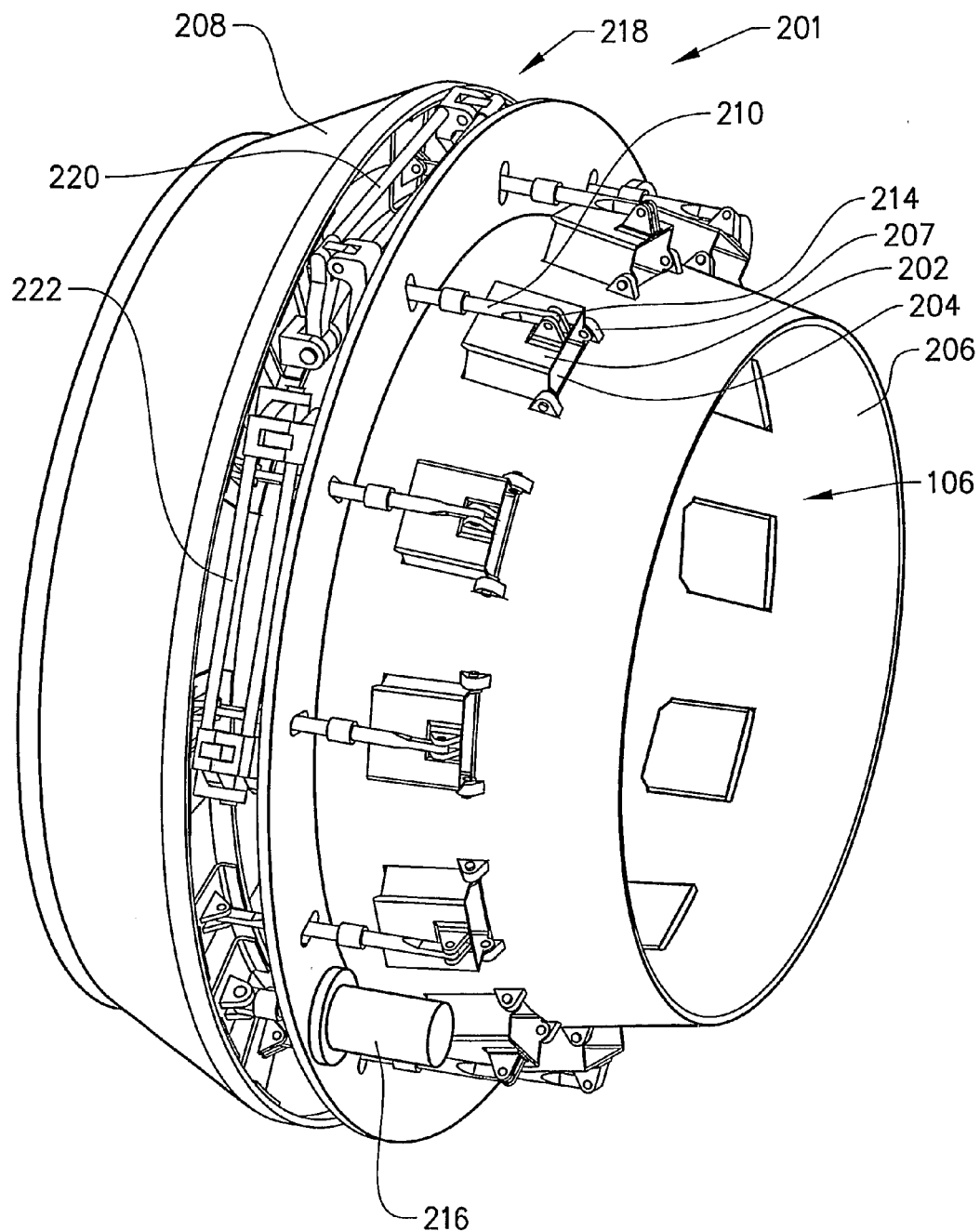
FIG. 2 shows a perspective view of a device for bleeding air from a primary gas duct in the engine shown in FIG. 1, the air bleed hatches being closed.

FIG. 2 shows a device 201 for pivoting at least one pivotable element 202 between a first and a second position in order to influence a gas flow in the annular gas duct 106. More specifically, the device 201 is arranged for bleeding air from the primary gas duct 106. The position of the air bleeding device 201 is indicated by the reference numeral 116 in FIG. 1. The air bleeding device 201 is therefore arranged between the low-pressure compressor 110 and the high-pressure compressor 111.

Multiple openings 204 spaced at intervals from one another in a circumferential direction are provided through a wall 206, which externally defines the primary gas duct 106. A pivotable element 202 is positioned at each opening 204 and is arranged to open and close the opening. The pivotable elements 202 form doors, or hatches, which in a closed position completely cover the openings 204. The pivotable elements are arranged with different angles in the first and second positions. More specifically, the pivotable elements 202 are pivoted about an axis 207, which extends at right angles to the axial direction 102 of the gas turbine, between the first and second positions. The pivotable elements 202 are arranged to be continuously adjustable and to assume any position between the first and second limit positions. The air bleeding device 201 therefore forms a valve system for variable control of the gas bypass.

Bleed lines (not shown) are connected to each of the openings 204 and extend between the primary gas duct 106 and the secondary gas duct 107. The bleed lines form a flow path for ducting air from the primary gas duct 106 to the secondary gas duct 107.

The air bleeding device 201 comprises an axially displaceable annular member 208, or guide ring, which is arranged externally around the gas duct 106 and is arranged to be displaced in a substantially axial direction of the gas duct. In other words, the annular member 208 is arranged to be displaced at right angles to the plane in which it extends. The annular member 208 is connected to the pivotable element 202 in order to effect the pivoting of the pivotable element when it is displaced axially. The pivotable element 202 is therefore arranged to be pivoted about the axis 207, which extends at right angles to the axial direction of the annular member 208 (that is to say its central axis).

The annular member 208 is arranged radially outside a fixed wall 206, which defines the annular gas duct 106 and is axially displaceable relative to the wall. The annular member 208 is continuous in a circumferential direction and surrounds the primary gas duct. The annular member 208 constitutes a unison ring which is positioned radially inside the external cowling of the gas turbine, and inside the intermediate casing 105.

The device 201 comprises at least one motion-transmitting member 210, which mechanically connects the axially displaceable annular member 208 and the pivotable element 202. More specifically, a motion-transmitting member 210 is connected to each of the pivotable elements 202. The motion-transmitting member 210 extends substantially in the axial direction of the gas turbine. The motion-transmitting member 210 is furthermore elongate and substantially rigid and at one end is connected to the axially displaceable annular member 208 and at the other end to the pivotable element 202 via pivot joints 212, 214, see FIG. 4. These pivot joints 212, 214 define a pivot axis, which extends at right angles to the axial direction of the gas turbine. More specifically, the pivot joints extend in a tangential direction to the circumferential direction of the gas duct.

The air bleeding device 201 further comprises multiple actuators 216, which are connected to the annular member 208 for displacement of the annular member between a first and a second position in the axial direction, which positions correspond to the first and second position of the pivotable element 202. The actuators 216 are firmly connected to a fixed part 206 of the gas turbine. The actuators 216 comprise multiple, suitably three, hydraulic cylinders, which are spaced at intervals from one another in the circumferential direction of the gas turbine 101. The connection between each of the actuators 216 and the ring 208 is suitably designed to allow for thermal expansion differences between the parts.

The air bleeding device 201 further comprises a linkage mechanism 218, which supports the axially displaceable annular member 208 in relation to the fixed part 206 and is arranged to control the axial movement of the annular member 208. The linkage mechanism 218 will be described in more detail with reference to FIGS. 4-8.

Figure 3:
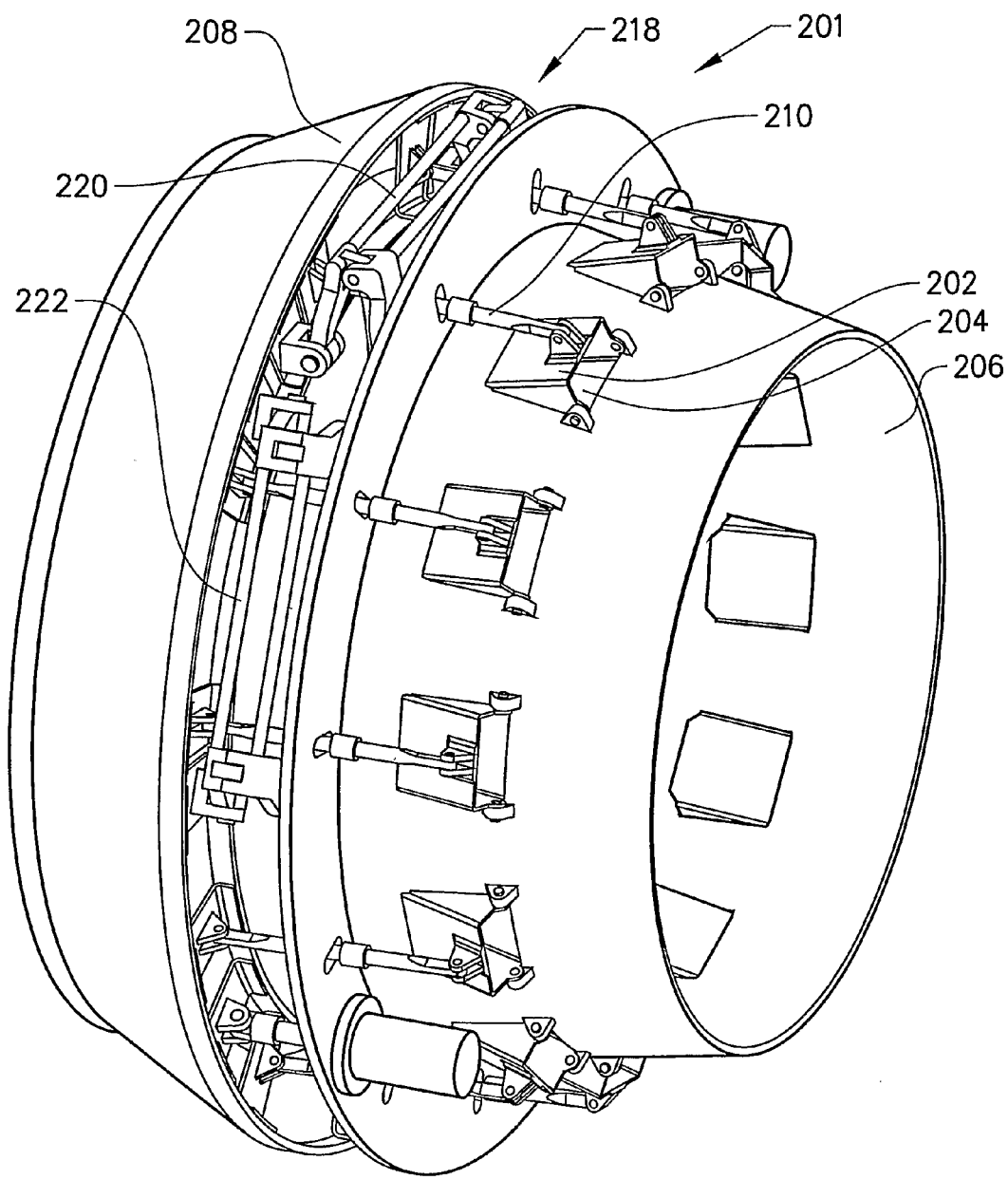
FIG. 3 shows the device according to FIG. 2, the air bleed hatches being open.
Figure 4:
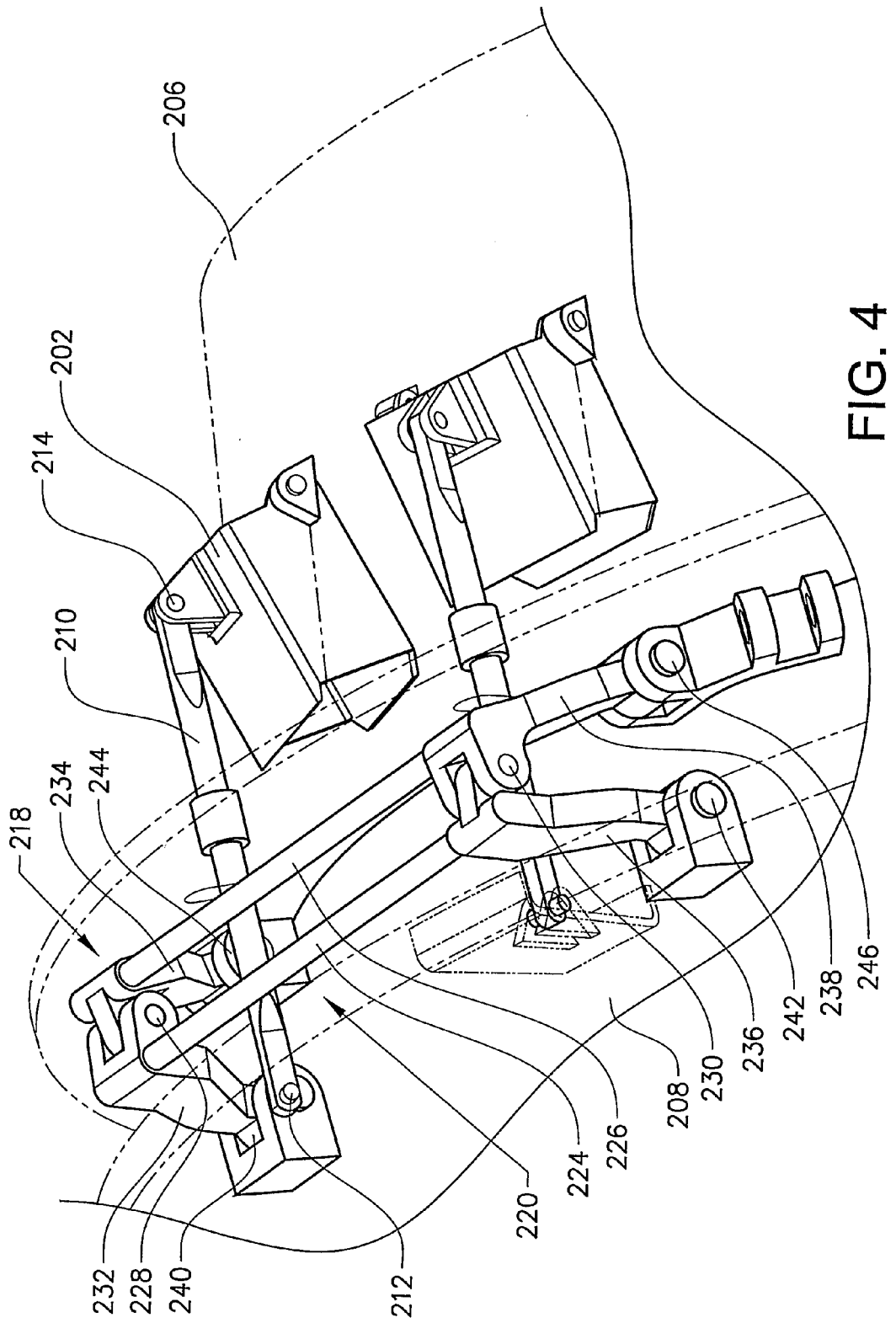
FIG. 4 shows a partially sectional perspective view of a linkage mechanism in the bleed device shown in FIG. 2.

In FIG. 2 the air bleeding device 201 is in a closed position, the hatches 202 completely covering the openings 204. In FIG. 3 the air bleeding device 201 is in an open position, the openings 204 being exposed.

The linkage mechanism 218 will be described below with reference to FIGS. 2-7. The linkage mechanism 218 comprises multiple link units 220, 222 in the circumferential direction of the gas duct, which connect the annular member 208 to the fixed part 206. In the embodiment shown the linkage mechanism 218 comprises three link units. A first and a second link unit 220, 222 are arranged adjoining one another in the circumferential direction of the gas duct and a third link unit (not shown) is arranged on the opposite side of the gas duct to the aforementioned link units. The third link unit is preferably arranged symmetrically in relation to the first and second link units 220, 222.

Each link unit 220 comprises two parallel, torsionally stiff stabilizer bars (torsion elements) 224, 226, which are pivotably connected to one another. The stabilizer bars 224, 226 are axially opposed to one another. In the example shown the stabilizer bars 224, 226 are identical, but they may also have different design shapes. A first stabilizer bar 224 is pivotably connected to the annular member 208 at two separate positions in a circumferential direction, and a second stabilizer bar 226 is pivotably connected to the fixed part 206 at two separate positions in a circumferential direction. Each pair of stabilizer bars 224, 226 is held parallel during movement of the ring 208 relative to the fixed part 206.

Each stabilizer bar 224, 226 further comprises an elongate, substantially straight rod, which extends in a tangential direction to the circumferential direction of the ring 208. The elongate rods of two opposing stabilizer bars 224, 226 are parallel to one another and are connected to one another via a pivot joint 228, 230 at each end. These pivot joints 228, 230 define a pivot axis which extends at right angles to the axial direction of the gas turbine. More specifically, the pivot joints extend tangentially to the circumferential direction of the ring 208. The pivot axis is therefore parallel to the direction in which the rods extend, the rods being maintained parallel during pivoting.

Each link unit 220 comprises a first leg 232 and a second leg 236, which connect a first stabilizer bar 224 to the annular member 208 via pivot joints 240, 242 at said separate positions in a circumferential direction.

A first leg 234 and a second leg 238 correspondingly connect a second stabilizer bar 226 to the fixed part 206 via pivot joints 244, 246 at said separate positions in a circumferential direction. The pivot joints 240, 242, 244, 246 define two parallel pivot axes (axes of rotation) which extend at right angles to the axial direction of the gas turbine. More specifically, the pivot joints extend tangentially to the circumferential direction of the ring 208. The first and second legs 232, 234, 236, 238 extend substantially in a radial direction and substantially parallel to one another when the hatches 202 are closed, see FIG. 6. The first legs 232, 234 and the second legs are in each case angled relative to one another and form a V-shape in the open position, see FIG. 7.

In other words, the three pivot axes which are defined by the pairs of pivot joints 228, 230; 240, 242; 244, 246 are parallel and form a V-shape. Different angles of the V-shape result in different degrees of opening of the hatches 202.

The distance between the pivot axes 228, 230 for the stabilizer bars 224, 226 and the pivot axes 240,242 against the ring 208 is equal to the distance between the pivot axes 228, 230 for the stabilizer bars 224, 226 and the pivot axes 244, 246 against the fixed part 206.

Said two distances, however, may differ while still retaining the same function.

Figure 5:
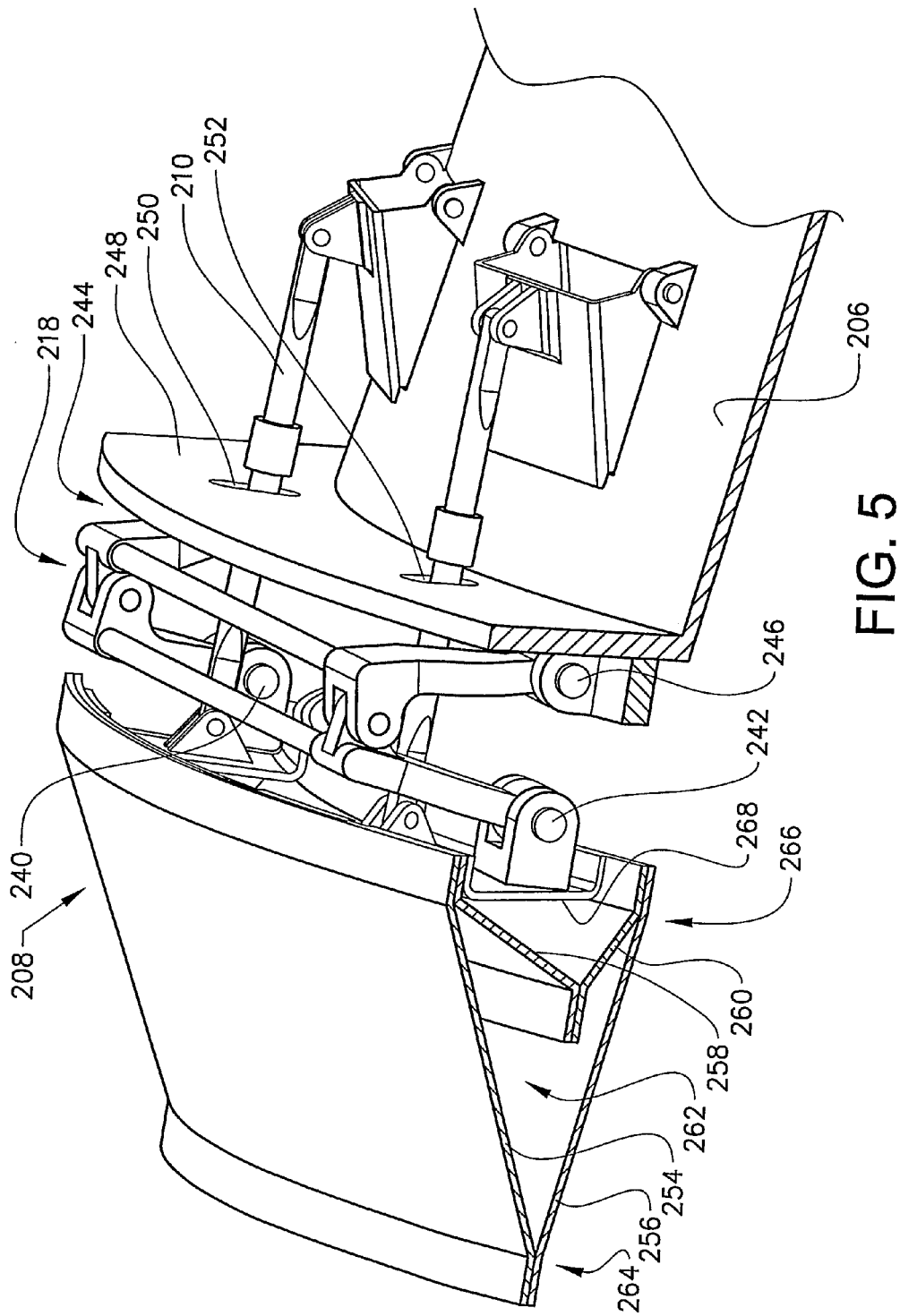
FIG. 5 shows the linkage mechanism in FIG. 4 from another angle.

FIG. 5 shows a flange 248 which extends substantially in a radial direction from the fixed wall 206. The flange 248 comprises multiple through holes 250, 252, which are spaced at intervals from one another in a circumferential direction for receiving the motion-transmitting rods 210. The pivot joints 244,246 of the linkage mechanism 218 are furthermore connected to the flange 248. In an alternative embodiment there is no flange, or the flange is substantially shorter, no holes being required for receiving the motion-transmitting rods 210.

The annular member 208 comprises multiple flanged, annular elements 254, 256, 258, 260 in the form of cones, or plates, which are firmly connected to one another and define an internal space 262. Each of the plates 254, 256, 258, 260 therefore has a conical shape. The annular member 208 has a substantially triangular cross-sectional shape with an acute angle pointing in an axial direction away from the flange 248.

More specifically, a first annular plate 254 defines a radially outer part of the annular member 208 and a second annular plate 256 defines a radially inner part of the annular member 208. The first and second annular plates 254, 256 are connected to one another in such a way as to define the acute angle 264. A third annular plate 258 is connected to the first annular plate at a distance from the acute angle 264 and extends towards the second plate 256. A fourth annular plate 260 is connected to the second annular plate 256 at a distance from the acute angle 264 and extends towards the first plate 256. Both the third and the fourth annular plate 258, 260 extend at an angle to the first plate and the second plate respectively and towards the pointed end 264. The third and fourth annular plates 258, 260 are connected to one another, a base section 266 of the ring 208 of the triangular cross section pointing towards the flange 248.

According to a variant, the internal space 262 of the ring 208 may be filled with a material, which gives the ring a greater rigidity, for example a hard foam material, suitably comprising polymer material. This is intended to create the prerequisites for using plates with a lesser thickness of material, making it possible to reduce the weight.

The linkage mechanism 218 is connected to the annular member 208 via the pivot joints 240, 242 and further flanged, flat-shaped connecting elements 268. The flanged, flat-shaped connecting elements 268 are spaced at intervals from one another in a circumferential direction and fixed to the first and second annular plates.

FIGS. 6 and 7 show a sectional side view of the linkage mechanism 218 in a closed and open position respectively, which correspond to the open and closed positions shown in FIGS. 2 and 3.

Figure 8:
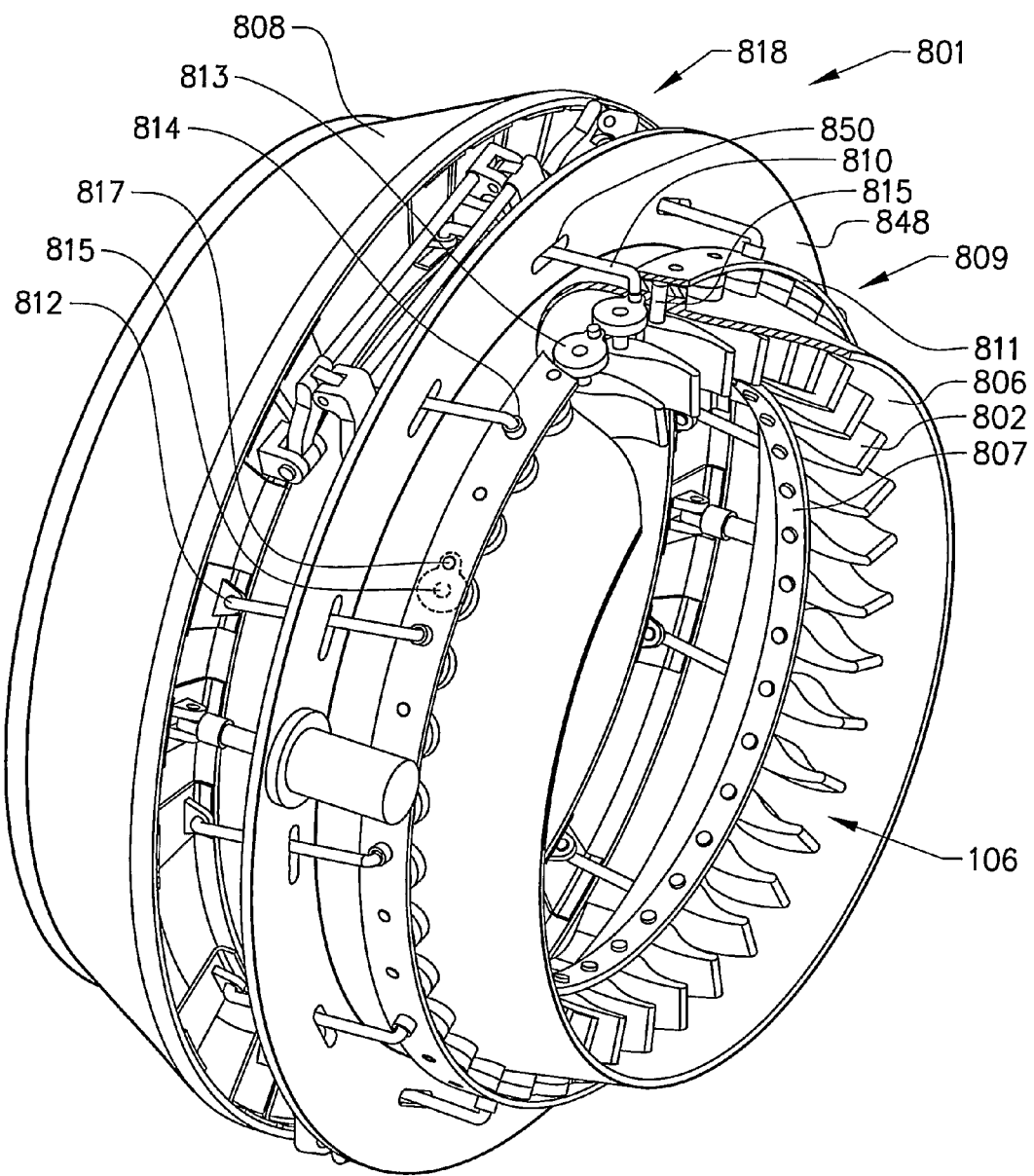
FIG. 8 shows a schematic, sectional perspective view of a device for controlling the setting of guide vanes in a primary gas duct of the engine shown in FIG. 1.

FIG. 8 shows a second embodiment of the invention, that is a device for controlling the setting (that is to say the angular position) of adjustable guide vanes 802 in a compressor stator and/or a turbine stator in a gas turbine. The adjustable guide vanes are also referred to as stays, or blades, and suitably have a vane-shaped cross-sectional profile. The guide vanes 802 are pivotably arranged in the gas duct 106, which is defined by an outer wall 806 and an inner wall 807. More specifically, FIG. 8 shows a device 801 for simultaneously pivoting the multiple guide vanes 802 between a first and a second position for directing a gas flow in the annular gas duct 106 to different degrees in different positions. The device 801 for adjusting the guide vanes 802 is of similar design to that described in detail above with reference to FIGS. 2-7. Only the differences will be described in further detail below.

The device 801 comprises an axially displaceable annular member 808, or ring, which is arranged externally around the gas duct 106 and arranged to be displaced in a substantially axial direction of the gas duct. The annular member 808 is connected to the guide vanes 802 in order to effect the pivoting of the guide vanes when it is displaced axially. Each of the guide vanes 802 is therefore arranged to be pivoted about an axis, which extends in the radial direction of the gas turbine. The device 801 further comprises a linkage mechanism 818, which supports the axially displaceable annular member 808 in relation to the fixed part 806 and is arranged to control the axial movement of the annular member 808. Both the annular member 808 and the linkage mechanism 818 are of the same design and are arranged in the same way as that described above for the air bleeding device 201.

Multiple motion-transmitting members 810, in the form of adjustment arms, are spaced at intervals from one another in a circumferential direction and connect the annular member 808 to a pivot mechanism 809. There are substantially fewer motion-transmitting members 810 than guide vanes 802. In the example shown, a motion-transmitting member 810 is provided for every third guide vane. The pivot mechanism 809 comprises an annular element 811, which extends around the outer wall 806 of the gas duct. The annular element 811 is arranged radially outside the guide vanes 802 and is connected to each of the motion-transmitting members 810 via a pivot joint 814.

Each guide vane 802 has a pivot pin 815, which extends radially through the outer wall 806. The pivot pin 815 is firmly connected to the guide vane 802 and to a flat-shaped linkage element 813, which is arranged radially outside the outer wall 806. The annular element 811 is connected to each of the flat-shaped linkage elements 813 via a pivot joint 817 at a distance from the pivot pin 815, so that the flat-shaped linkage element 813 is pivoted when the annular member 808 is displaced in an axial direction. The guide vanes 802 are therefore pivoted by displacement of the annular element 811 in an axial direction and to some extent in a radial direction, while the flat-shaped linkage element 813 is being pivoted.

Each of the motion-transmitting members 810 is connected to the annular member 808 in such a way that it can be pivoted by a certain angle in the circumferential direction of the gas turbine, in order to transmit the movement. A through hole 850 through the flange 848 of the fixed part 806 has an elongate cross-sectional shape so as to permit this pivoting movement. The pivot joint 812 therefore has a pivot axis in the radial direction of the gas turbine.

The invention is in no way limited to the embodiments described above, a number of alternatives and modifications being possible without departing from the scope of the following patent claims.

According to one alternative, the air bleeding device is arranged downstream of the combustion chamber 112 in order to lead air from the primary gas duct 106 to the secondary gas duct 107. More specifically, the air bleeding device may be arranged between the high-pressure turbine 113 and the low-pressure turbine 114.

According to a further alternative, the air bleeding device is not limited to an arrangement extending through an outer wall of the inner gas duct, such as the primary gas duct 106, but can also be arranged through a radially inner wall of an outer gas duct, such as the fan duct 107. In such a case the annular member should naturally be arranged radially inside the outer gas duct.

The air bleeding device could furthermore be arranged radially outside the outer gas duct (the fan duct). For example, the device 801 for guide vane adjustment may also be used for adjusting fan guide vanes.

Moreover, the specific embodiment of the pivot mechanism 809 in FIG. 8 must only be regarded as an example of the pivoting of the guide vanes 802 via axial displacement of the annular member 808.

The invention can furthermore be used for other gas turbine applications, such as vehicle engines, for example, power plants in vehicles and in fixed applications, such as power plants for electrical power generation.

The invention claimed is:

1. A device for pivoting at least one pivotable element in a gas turbine engine between a first and a second position in order to influence a gas flow in an annular gas duct in at least one of the positions, the device comprising
 a moveable annular member which is arranged externally around the gas duct and is connected to the pivotable element in order to effect the pivoting of the pivotable element, wherein the annular member is arranged to be displaced in a substantially axial direction and arranged to pivot the pivotable element when it is displaced axially,
 a linkage mechanism, the linkage mechanism connecting the annular member and a fixed part, the linkage mechanism supporting the annular member in relation to the fixed part and being arranged to control axial movement of the annular member, wherein the linkage mechanism comprises at least two parallel stabilizer bars, a first stabilizer bar being pivotably connected to the annular member at two separate positions in a circumferential direction of the device, and a second stabilizer bar being pivotably connected to the fixed part at two separate positions in the circumferential direction, and
 an actuator, which is connected to the annular member for displacement the annular member between a first and a second position in the axial direction, which positions correspond to the first and second position of the pivotable element, the actuator and the linkage mechanism being separate structures.

2. The device as claimed in claim 1, wherein the annular member is arranged radially outside a fixed wall which defines the annular gas duct and is axially displaceable relative to the wall.

3. The device as claimed in claim 1, wherein multiple pivotable elements are spaced at intervals from one another in a circumferential direction.

4. The device as claimed in claim 1, wherein the device comprises at least one motion-transmitting member, which mechanically connects the axially displaceable annular member and the pivotable element.

5. The device as claimed in claim 4, wherein the motion-transmitting member extends substantially in the axial direction of the gas turbine.

6. The device as claimed in claim 4, wherein the motion-transmitting member is elongate and substantially rigid and at one end is connected to the axially displaceable annular member and at the other end is connected to the pivotable element via pivot joints.

7. A device for pivoting at least one pivotable element in a gas turbine engine between a first and a second position in order to influence a gas flow in an annular gas duct in at least one of the positions, the device comprising
 a moveable annular member which is arranged externally around the gas duct and is connected to the pivotable element in order to effect the pivoting of the pivotable element, wherein the annular member is arranged to be displaced in a substantially axial direction and arranged to pivot the pivotable element when it is displaced axially, and
 a linkage mechanism, which supports the axially displaceable annular member in relation to a fixed part and is arranged to control the axial movement of the annular member, wherein the linkage mechanism comprises at least two parallel stabilizer bars, a first stabilizer bar being pivotably connected to the annular member at two separate positions in a circumferential direction of the device, and a second stabilizer bar being pivotably connected to the fixed part at two separate positions in the circumferential direction.

8. The device as claimed in claim 7, wherein the stabilizer bars are arranged in axial opposition to one another and are pivotably connected to one another.

9. The device as claimed in claim 7, wherein each stabilizer bar comprises an elongate rod, which extends at least partially in the circumferential direction, the elongate rods of two opposing stabilizer bars being parallel to one another and connected to one another via a pivot joint.

10. The device as claimed in claim 7 wherein each linkage mechanism comprises two sets of a first leg and a second leg, which connect the stabilizer bar to the fixed part and the annular member respectively in the separate angular positions.

11. The device as claimed in claim 7, wherein the linkage mechanism comprises multiple link units in the circumferential direction of the vas duct, which connect the annular member to the fixed part, each link unit comprising a pair of the stabilizer bars.

12. The device as claimed in claim 1, wherein the pivotable element is arranged to be pivoted about a pivot axis, which extends at right angles to the axial direction of the gas duct.

13. The device as claimed in claim 1, wherein the pivotable element is arranged to be pivoted about a pivot axis, which extends tangentially to the circumferential direction of the vas duct.

14. The device as claimed in claim 1, wherein the pivotable element forms a hatch, which is arranged to open and close an opening in as wall, which defines the gas duct for the purpose of bleeding gas.

15. The device as claimed in claim 14, wherein multiple hatches are spaced at intervals from one another in a circumferential direction, each door being positioned to open and close an opening in the wall.

16. The device as claimed in claim 1, wherein the pivotable element is arranged to be pivoted about a pivot axis, which extends substantially radially in relation to the gas duct.

17. The device as claimed in claim 1, wherein the pivotable element forms a guide vane which is arranged in the gas duct, the guide vane being arranged to be positioned in at least two separate angular positions.

18. The device as claimed in claim 17, wherein multiple guide vanes are spaced at intervals from one another in a circumferential direction.

19. A gas turbine comprising the device as claimed in claim 1.

20. An aircraft engine comprising the device as claimed in claim 1.

21. The device as claimed in claim 1, wherein the linkage mechanism comprises a first leg connected to the annular member and a second leg connected to the fixed part, the first and second legs being pivotably connected at a pivot joint having an axis extending at a right angle to an axial direction of the gas duct so that pivoting of the first and second legs about the pivot axis produces only axial movement of the annular member relative to the fixed part.

* * * * *